United States Patent
Araya et al.

(10) Patent No.: US 10,560,668 B2
(45) Date of Patent: Feb. 11, 2020

(54) INTEGRATING DATA FROM MULTIPLE DEVICES

(71) Applicant: Utility Associates, Inc., Decatur, GA (US)

(72) Inventors: Simon Araya, Decatur, GA (US); Ted Michael Davis, Decatur, GA (US); Robert Stewart McKeeman, Decatur, GA (US)

(73) Assignee: Utility Associates, Inc., Decatur, GA (US)

( * ) Notice: Subject to any disclaimer, the term of this patent is extended or adjusted under 35 U.S.C. 154(b) by 0 days.

(21) Appl. No.: 16/271,000

(22) Filed: Feb. 8, 2019

(65) Prior Publication Data
US 2019/0246078 A1 Aug. 8, 2019

Related U.S. Application Data

(63) Continuation of application No. 15/586,079, filed on May 3, 2017, now Pat. No. 10,205,915, which is a
(Continued)

(51) Int. Cl.
*H04N 9/80* (2006.01)
*H04N 7/18* (2006.01)
(Continued)

(52) U.S. Cl.
CPC .............. *H04N 7/188* (2013.01); *G01S 19/17* (2013.01); *G07C 5/0866* (2013.01); *G11B 19/02* (2013.01);
(Continued)

(58) Field of Classification Search
CPC ......... G11B 19/02; G11B 27/02; G11B 27/34; G11B 31/006; H04N 5/772; H04N 5/77;
(Continued)

(56) References Cited

U.S. PATENT DOCUMENTS 6,831,556 B1 12/2004 Boykin et al.
8,781,292 B1 7/2014 Ross et al.
(Continued)

FOREIGN PATENT DOCUMENTS

GB 2452094 A 2/2009
GB 2455837 A 6/2009

OTHER PUBLICATIONS

Extended European Search Report issued for corresponding European Patent Application No. 15180451.5, dated Jun. 9, 2016.
(Continued)

*Primary Examiner* — Robert Chevalier
(74) *Attorney, Agent, or Firm* — Meunier Carlin & Curfman LLC

(57) ABSTRACT

A recording system for an emergency response unit includes a first data collection device configured to record a first video, audio or data segment with an incident identifier and transmit a message including the incident identifier. A second data collection device may receive the message and, as appropriate, record at least a second video, audio or data segment with the incident identifier, allowing the first segment and the second segment to be associated using the incident identifier. In other embodiments, a first recording device may begin recording video, audio or legal evidence data with an incident identifier, and a control system may receive a message including the incident identifier from the first recording device, identify one or more additional recording devices located within a certain distance of the first recording device, and obtain recordings from the one or more additional recording devices.

15 Claims, 9 Drawing Sheets

Related U.S. Application Data continuation of application No. 14/820,092, filed on Aug. 6, 2015, now abandoned.

(60) Provisional application No. 62/035,292, filed on Aug. 8, 2014.

(51) Int. Cl.

| | | |
|---|---|---|
| *G07C 5/08* | (2006.01) | |
| *H04N 5/77* | (2006.01) | |
| *H04N 9/802* | (2006.01) | |
| *H04N 9/82* | (2006.01) | |
| *G01S 19/17* | (2010.01) | |
| *G11B 19/02* | (2006.01) | |
| *G11B 27/02* | (2006.01) | |
| *G11B 27/34* | (2006.01) | |
| *G11B 31/00* | (2006.01) | |
| *H04N 5/765* | (2006.01) | |
| *G08B 13/196* | (2006.01) | |

(52) U.S. Cl.
CPC .............. *G11B 27/02* (2013.01); *G11B 27/34* (2013.01); *G11B 31/006* (2013.01); *H04N 5/77* (2013.01); *H04N 5/772* (2013.01); *H04N 7/181* (2013.01); *H04N 9/802* (2013.01); *H04N 9/8205* (2013.01); *G08B 13/19669* (2013.01)

(58) Field of Classification Search
CPC ...... H04N 9/802; H04N 9/8205; H04N 7/188; H04N 7/181; G07C 5/0866; G01S 19/17; G08B 13/19669
USPC ....... 386/241, 200, 210, 224, 226, 227, 229, 386/239, 248, 291
See application file for complete search history.

(56) References Cited

U.S. PATENT DOCUMENTS

| | | |
|---|---|---|
| 2003/0185296 A1 | 10/2003 | Masten |
| 2008/0100705 A1 | 5/2008 | Kister et al. |
| 2010/0194558 A1 | 8/2010 | Toh et al. |
| 2012/0120248 A1 | 5/2012 | Ju et al. |
| 2014/0368601 A1* | 12/2014 | deCharms ............. H04W 4/021 348/14.02 |
| 2015/0098686 A1* | 4/2015 | Obukhov ......... G08B 13/19656 386/226 |

OTHER PUBLICATIONS

Partial European Search Report issued for corresponding European Patent Application No. 15180451.5, dated Feb. 3, 2016.

* cited by examiner

INTEGRATING DATA FROM MULTIPLE DEVICES

This application claims priority to U.S. Provisional Application No. 62/035,292, filed Aug. 8, 2014, the contents of which are expressly incorporated herein by reference in its entirety.

TECHNICAL FIELD

The present disclosure relates to the capture and integration of legal evidence video, audio, and/or metadata from emergency response vehicles, first responder personal body cameras, fixed location video camera systems, audio microphones, and other mobile and fixed location video, audio, and metadata collecting devices that may be used or utilized during response to an incident.

BACKGROUND

Emergency response vehicles are used to transport personnel and materials to a wide variety of situations or incidents. Such vehicles (police cars, ambulances, rapid deployment vehicles, command units and other land-based vehicles) and the personnel that staff them increasingly rely on storing video and audio as personnel address the situation or incident, thereby increasing the safety of personnel, assisting with solving crimes, and providing training aids. Emergency response vehicles may include multiple video cameras, microphones, and other data capturing devices, and the information captured by such devices can be combined by a server in the vehicle into an integrated data stream. For example, U.S. Pat. No. 6,831,556 teaches a system for capturing and storing video, audio and data legal evidence information using devices such as video cameras, microphones and sensors. In such a system, the captured information is combined into a single, integrated data stream. The integrated data stream is stored in the vehicle and then transferred to a second location.

Historically, wireless recording devices were limited to the range of the local wireless communications system. Further, at least some wireless systems were limited in that communications needed to be according to a "line-of-sight" transmission. Still further, some systems may require "registration" of the data collection devices, or some other advance coordination or setup, before a given device may become engaged or otherwise involved in the incident. Yet further, some systems may require manual intervention or manual activation of a device by persons involved in the incident before the data collection device is engaged or otherwise becomes relevant to an incident. In many cases an incident involves multiple emergency response vehicles and multiple personnel (e.g., officers, medical technicians, etc.) responding to the incident at various times and stages of the incident, often such other personnel have their own vehicle with its own server with one or more wired and wireless video cameras, audio microphones, and personal body cameras. The legal evidence video, audio, and metadata captured by devices associated with each of the emergency response vehicles, including personal body cameras, audio microphones and any other, data capturing devices involved in the incident, are all logically part of (or addressing) the overall incident, even though such video cameras, microphones, personal body cameras, video drones, and other data capturing devices may be associated with different vehicle servers or operate independently of any particular emergency response vehicle server. In addition, there are often fixed location security cameras, microphones, gunshot audio triangulation location reporting systems, and other legal evidence gathering devices in the vicinity of the incident.

An incident may also span across multiple locations. Particularly in the case of a pursuit, there may be video, audio, and metadata legal evidence information captured by fixed location video cameras and/or audio microphones, helicopters, aircraft, video drones, license plate recognition systems, gunshot detection and location technology systems and other devices that capture legal evidence information (i.e., video, audio and metadata) relevant to the incident. As another example, a pursuit may pass near a fixed location video camera or microphone, or other fixed location or mobile device, which might capture data relevant to the incident. It would be desirable to include legal evidence data from all recording devices, including vehicle-based video, audio and metadata devices, personal body cameras, other mobile devices, and/or any fixed location video, audio, and metadata data capture devices that are in the vicinity of an incident into an overall integrated data stream for the incident. It would be useful for all video, audio and metadata legal evidence data collection devices which are at some point within the vicinity of an incident to be logically tied or otherwise a part of the incident, and therefore, a part of any integrated data stream of data concerning the incident.

It is known that systems for capturing video, audio and other legal evidence data in emergency response vehicles may be activated manually by a first responder or automatically upon activation of a separate device, such as a police car light bar or a siren. In addition, legal evidence video may be buffered before an incident or event occurs, and recorded for permanent storage once the incident or event occurs. Often actions relevant to an incident occur before the first responder is aware that an incident is in progress. For example, an officer may observe a vehicle approaching or passing by at high speed, see a crash, notice suspicious behavior or a crime in progress, and then react by turning on a police car light bar or siren, removing a weapon from a storage rack, pressing the video system record button, or taking some other action that triggers the system to start recording an incident. Pre-event buffering allows video from, for example, 30 or 60 seconds before recording was actually triggered to be stored. The vehicle's video cameras, audio microphones, personal body cameras, and other devices associated with the vehicle can continuously record and buffer a set data quantity or elapsed time of video, audio, and metadata. When a triggering event occurs, the prior 30 or 60 seconds of pre-event video, audio, and/or metadata can be stored.

It would be desirable to also capture and store pre-event legal evidence data captured by other vehicle system devices, mobile devices, personal body cameras, and fixed location video cameras and microphones that are in the vicinity of the incident. For example, a suspect vehicle may have very recently passed by a second first responder vehicle, fixed location video camera, or beat officer walking near the incident with a personal body camera, any of which that were also continuously recording and buffering pre-event data, but did not have a direct triggering event. A person of interest might have taken some action out of view of a police car before rounding a corner, but was within view of a second police car, officer with a personal body camera attached to their clothing, or a fixed location video security camera. It would be desirable to also capture and integrate pre-event legal evidence data from these other mobile and fixed location cameras, microphones and other data capturing devices into an integrated data stream for the incident even though the other vehicle server, personal body cameras, or fixed location cameras were not be directly triggered to save the pre-event data.

As a further example, an officer in a different vehicle in the vicinity of an incident may not have directly observed an event or action that would have prompted turning on the video recorder system, and therefore the vehicle system would not save pre-event data. In another example, an officer walking a beat in the vicinity of an incident may not have personally noticed any initial events related to the incident, so the officer's personal body camera would not be triggered to save buffered pre-event data. In these examples and others, buffered pre-event data from nearby vehicles, personal body cameras, mobile devices, or fixed location devices might be overwritten and lost, even though some or all of this buffered pre-event data might provide legal evidence and capture a record of facts that are relevant to the incident. It would be desirable to have a triggering event in one device propagate to other video, audio, and metadata capture devices in the vicinity of an incident, so that pre-event data from additional devices in the vicinity would capture data that would potentially be legal evidence.

Moreover, outside of a planned stakeout involving multiple vehicles and first responders, it is often not possible to know in advance which vehicle, personal body camera, mobile device, and fixed location video cameras and microphones might capture legal evidence video, audio, and metadata relevant to an incident. Vehicles, personal body camera, other mobile devices, and fixed location cameras that were not pre-assigned or dispatched to the incident might still become involved in the incident without any advance notice. The evolution of events in any incident is impossible to predict in advance, so there is no way to predict in advance which video, audio, and/or metadata devices might be nearby the location of and relevant to an incident. So in most cases it is not possible to pre-register or otherwise logically associate nearby cameras, personal body cameras, microphones, and other devices in advance of the incident. It would be useful to have a method to notify and trigger the start of data capture from one or multiple video, audio, or metadata collection devices in the vicinity of an incident. It would further be useful to provide a means to trigger the retention of pre-event legal evidence data in any nearby but previously unassociated recording or capturing devices, including, for example, video cameras, personal body cameras, audio microphones, mobile devices, fixed location devices, and/or other video, audio, and metadata collecting devices, so that such unknown and previously unassociated devices could also contribute video, audio, and metadata legal evidence that could be relevant to an incident in progress and included in an overall integrated data stream.

As explained above, it is difficult to predict in advance which video, audio, and metadata devices might be nearby a location of and relevant to a particular incident. As an incident progresses, it would be useful to have a device that is in the incident in progress capturing data relevant to the incident) notify other devices that the incident is in progress within the vicinity so that such other devices can determine to join (or not to join) the incident. For example, it would be useful for the first responder's (police officer's) personal body camera, wireless microphone or other data collective device to provide notification of an incident in progress so that other devices can determine if they are within the vicinity on the incident in progress and, if so, trigger recording in these now nearby other devices. Further, it would be useful and would increase officer safety for police vehicle servers, personal body cameras, wireless microphones and other devices involved around an incident to report real-time metadata such as current location and status, as well as selectively stream video and audio data, to a central facility such a central Situational Awareness Command and Control Dispatch Center, a Video Integration Center, and back to vehicle servers and other data collection devices involved in a incident. This would be useful to provide real time visibility and a map-based view of the location and status of all devices that have become involved in an incident. An example would be a real-time location and status report from an officer's personal body camera to a laptop computer (or tablet display) in a police vehicle so that an officer in the vehicle would be able to see the real time location of his or her partner who was involved in a foot chase and is beyond visual view from the vehicle.

As shown by the foregoing, it would be desirable for a device, particularly a mobile device, to automatically and continually broadcast location and status metadata, and the direction of travel if in motion, without manual effort or intervention by the first responder. Police officers and other first responders in the field should not be distracted by having to perform location identification and reporting tasks. It would be useful to provide a system that was capable of including all video, audio and/or metadata legal evidence from all mobile and fixed location devices that come within the vicinity of an active incident to be included within the integrated video, audio and metadata legal evidence stream for an incident. It would be further useful if such inclusion could occur on an ad hoc and autonomous basis as an incident evolves, without requiring any advance "registration" or other advance coordination and set up, or manual action by persons involved in the incident.

The present disclosure is directed to overcoming these problems and other issues in the prior art.

SUMMARY

The present disclosure addresses the above-mentioned deficiencies in the prior art by providing a method and apparatus for interpreting data from multiple devices. This summary is provided to introduce certain concepts, to identify certain examples, and not necessarily to address all embodiments in accordance with the description of the invention below. The description of exemplary embodiments is not intended to limit the scope of the invention as set forth in the appended claims.

In one exemplary embodiment, a recording system for an emergency response unit includes a first recording device configured to record a first video segment with an incident identifier and transmit a message including the incident identifier. A second recording device may receive the message and record a second video segment with the same incident identifier, allowing the first video segment and the second video segment to be associated using the incident identifier.

In another embodiment, one or more computer readable media include instructions which, when executed by one or more processors, perform a method including recording a first video or audio segment with an incident identifier and transmitting a message including the incident identifier. The method may also include receiving the message, recording a second video or audio segment with the incident identifier, and associating the first video segment and the second video segment using the incident identifier.

In another embodiment, a first recording device may begin recording video with an incident identifier, and a control system may receive a message including the incident identifier from the first recording device, identify one or more additional recording devices located within a certain distance of the first recording device, and obtain recordings from the one or more additional recording devices.

In another embodiment, all video, audio and/or metadata from all mobile and fixed location devices that determine they are within range of an active incident contribute data that may be combined into an integrated video, audio and metadata legal evidence stream for the incident. In a still further embodiment, the integration of such video, audio and/or metadata is able to occur on an ad hoc basis, without requiring advance registration or setup between the video, audio or metadata collective devices that become relevant to and involved in an incident based upon their location. It is important to note that a device that triggers recording does not have to be a recording device itself.

Thus, it is to be understood that an exemplary embodiment of the present invention includes beaconing or broadcasting incident information to another device or other devices as that such other device or devices can collect data that may be used as legal evidence. If such other device or devices receive an incident beacon message (which may include location information) regarding an active incident that is within, for example, a set range of the broadcasting devices' current location, the new other device (or devices) determines whether it is within the vicinity (as defined by the set range) and may retain the incident identifier and join the incident. If the beacon receiving device determines that it is within the vicinity and is not recording already, it starts recording video, audio metadata legal evidence information including the unique incident identifier, just as if the beacon receiving device had directly received a trigger event (e.g., a siren or lightbar was turned on or it was manually activated). The new beacon receiving device also retains pre-event video, audio and metadata, and associates the pre-event data with the unique incident identifier, and also starts broadcasting an incident beacon message with the unique incident identifier (which may include location information) to alert other nearby devices to also join the incident. The invention may further include means for preventing a runaway initiation where all devices cascade and are added to the incident regardless of their distance from the device that originated the incident. The present invention may therefore further include an incident termination beacon message to devices that have become involved in the incident in some way. Such a message could be broadcast by a central video management or computer-aided dispatch system. Still further, the invention ray include terminating a device recording when it or the incident moves out of range of an area, which may be a designated geo-fence around the incident.

It is also to be understood that all embodiments support policy-based recording and notification on the video, audio, and metadata legal evidence capture devices. That is, individual devices receive beacon messages, sensor inputs, or broadcast data and autonomously perform tasks and execute processes based upon analysis of the content of single or multiple beacons, sensor inputs, and/or broadcast messages. Individual devices will decide based upon policy rules and software processing logic on the device itself that combines rules with messages and sensor inputs to perform or stop an action. The individual devices have processing capability and data storage to maintain software logic sequences, parameter settings, and policy-based business rules. As one example, policy makers in a police department or legislature will make policy decisions such as when a Police Officer can manually start or stop recording. A policy decision may be that an officer cannot manually stop recording when the associated patrol car light bar is flashing. Another example is the device may start recording whenever an officer starts running or gets into a struggle as indicated by a sensor input from the device's accelerometer. Another example is whether recording will automatically stop when an officer leaves a GeoFence zone based upon an input from the device's GPS sensor. Another example is a body-worn recording device will automatically start recording when a) the in-car video recording device has already started recording when the patrol car light bar is turned on plus b) the vehicle speed from the body-worn device GPS is zero plus c) a sensor on the patrol car driver door hardwired to the in-car video recorder indicates the door has been opened plus d) the in-car video recorder transmits a message or beacon to the personal video recording device to indicate that the light bar is on and the patrol car door was just opened. Another example is a personal accelerometer device that may be a 3 or 6 axis accelerometer, and may determine that an officer has gone from a vertical orientation to a horizontal orientation. Based upon a policy of a preset time, the device's audio speaker may audible announce an "Officer Down" audio message, initiate a device vibration, display a warning light flash sequence, and/or other indicator, where the officer knows he or she has a limited time to respond and to take an action that indicates the officer is able to respond to the device indicating there is no emergency, such as press a button on the body-worn or say a keyword command. If the officer does not respond to the input prompt(s), after a set amount of time the body-worn device will automatically a) start video recording on the device if it is not recording already, b) transmit an emergency "Officer Down" data message and beacon with the officer identity and exact GPS coordinates based upon the GPS sensor in the body-worn device that can be received by central dispatch and also by the body-worn device of any other body-worn devices within beacon range of the device, and c) audibly play an emergency tone, siren, or message at full speaker volume indicated Officer Down. A combination of multiple messages and sensor inputs would be the policy rule that triggers the personal data collection device associated with an officer (or other first responder) to automatically start recording or take an action such as transmitting an "Officer Down" alert. So the officer does not have to remember to manually push a recording "start" button on his or her personal video recorder when they step out of the vehicle to respond to a situation, or they get injured in an incident. Smart legal evidence data collection devices will execute these management policies based upon beacon messages and broadcasts received, and/or based upon sensor inputs from the device itself. These smart devices take action autonomously based upon received inputs and embedded software, parameters and rules, such as location. So these devices function independently based upon the embedded policy rules established by policy makers-policy-based recording. Most importantly, these devices are not always dependent upon a human being remembering to press an on or off switch, or otherwise take a manual action based upon their understanding and interpretation of policy rules at the moment, when they may already be task saturated. In all cases, human beings are not asked or required to manually do what the technology can automatically do.

In another embodiment, the present invention may also include transfer of the recorded data, including the unique incident identifier information in the metadata, to a central legal evidence management system for integration, retention, and possible uses as legal evidence for the incident.

Other aspects, features and advantages of the invention will be apparent from a review of the detailed description in conjunction with the accompanying drawing figures.

DETAILED DESCRIPTION

Before embodiments of the present disclosure are described in detail, it is to be understood that the apparatus, methods and systems are not limited to specific methods, specific components, specific features, specific systems or particular compositions. The terminology used herein is for the purpose of describing particular embodiments only and is not intended to be, and is not, limiting. The term "exemplary" means "an example" or "an example of" and is not meant to convey a meaning of an ideal or preferred embodiment or feature. Further, the term "such as" is merely explanatory and indicative that any recited items are examples of what is covered by a stated feature or provision; it is not needed to be restrictive.

This disclosure is of components and features that can be used to perform the disclosed methods, apparatus or systems. When combinations, subsets, interactions, groups, etc. of such components and features are disclosed, even when reference is not explicitly made to all possible combinations or permutations, each is contemplated and described for all methods, apparatuses and systems. This applies to all aspects of the disclosed invention, including steps of the method. Thus, if additional steps may be performed, it is understood that such additional steps may be performed with a specific disclosed embodiment or combination of embodiments.

Figure 1:
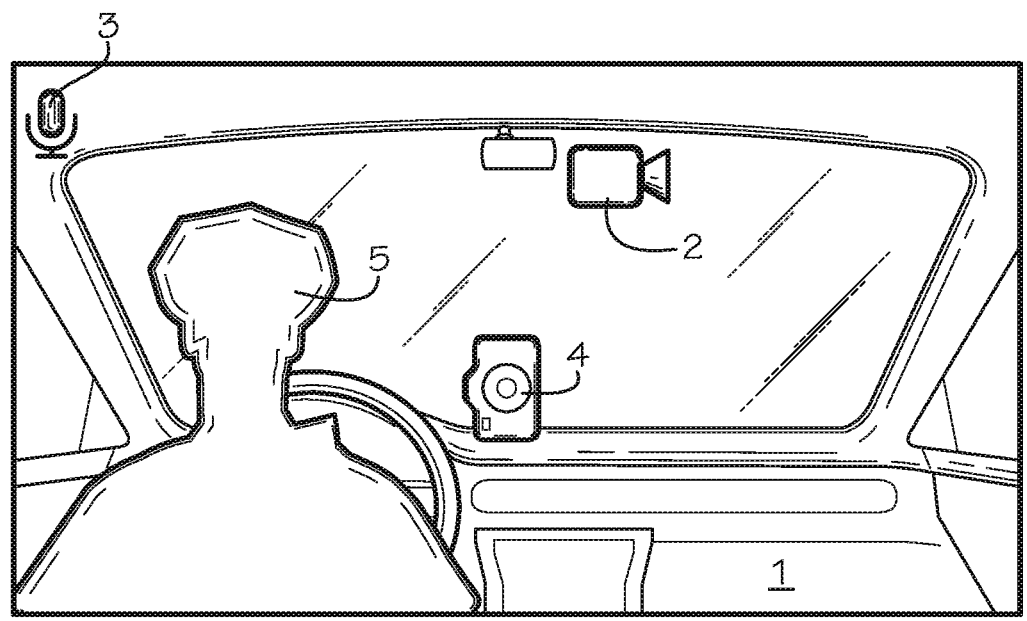
FIG. 1 is a schematic view of a vehicle with multiple wired and wireless video, audio, and metadata collection devices, where an incident can be initiated automatically by the system or manually by the actions of a first responder in the vehicle according to an exemplary embodiment of the present disclosure.

FIG. 1 illustrates an exemplary schematic view of a vehicle with multiple wired and wireless video, audio, and metadata collection devices, where an incident can be initiated automatically by the system or manually by the actions of a first responder in the vehicle. Specifically, a first responder vehicle 1 has multiple data collective devices, which may be wired and wireless, and include a video camera 2, an audio microphone 3, and a metadata collection device 4. In use of such devices, recording of an incident can be initiated automatically by a triggering event such as turning on the light bar (not shown), turning on the siren, rapid acceleration of the vehicle 1 or other triggering action, or manually by the actions of a first responder 5 pressing a record button (not shown) in the vehicle 1. As described in more detail below, the disclosed systems and methods allow legal evidence audio and video streams from a plurality of vehicles to be integrated and associated with metadata that identifies a particular incident. Once recording has begun, the incident essentially includes the device or devices. Accordingly, the incident may be considered to include the recording device.

Figure 2:
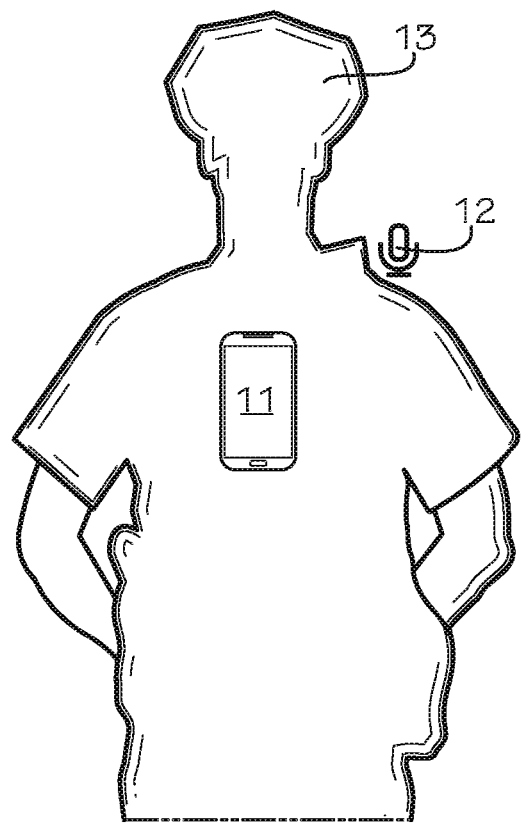
FIG. 2 is a schematic view of a mobile video, audio, and/or metadata legal evidence collection device where an incident can be initiated manually by the wearer of the personal body camera, wireless microphone, or other mobile device according to an exemplary embodiment of the present disclosure.

FIG. 2 illustrates an exemplary schematic view of a mobile video, audio, and/or metadata collection device 11 where an incident can be initiated manually by the wearer of a personal body camera, wireless microphone, or other mobile device. Device 11 may be, for example, a video, audio, and/or metadata collection device 11, such as a smartphone. Recording of an incident can be initiated manually by the wearer 13 of the device 11, wireless microphone 12, or other mobile device. For example, the wearer 13 may press a button (not shown) on the device 11 to indicate an incident and begin recording or use a voice command that may be detected by microphone 12 which, as is known in the art, communicates with the smart phone or other device 11 to initiate recording.

Figure 3:
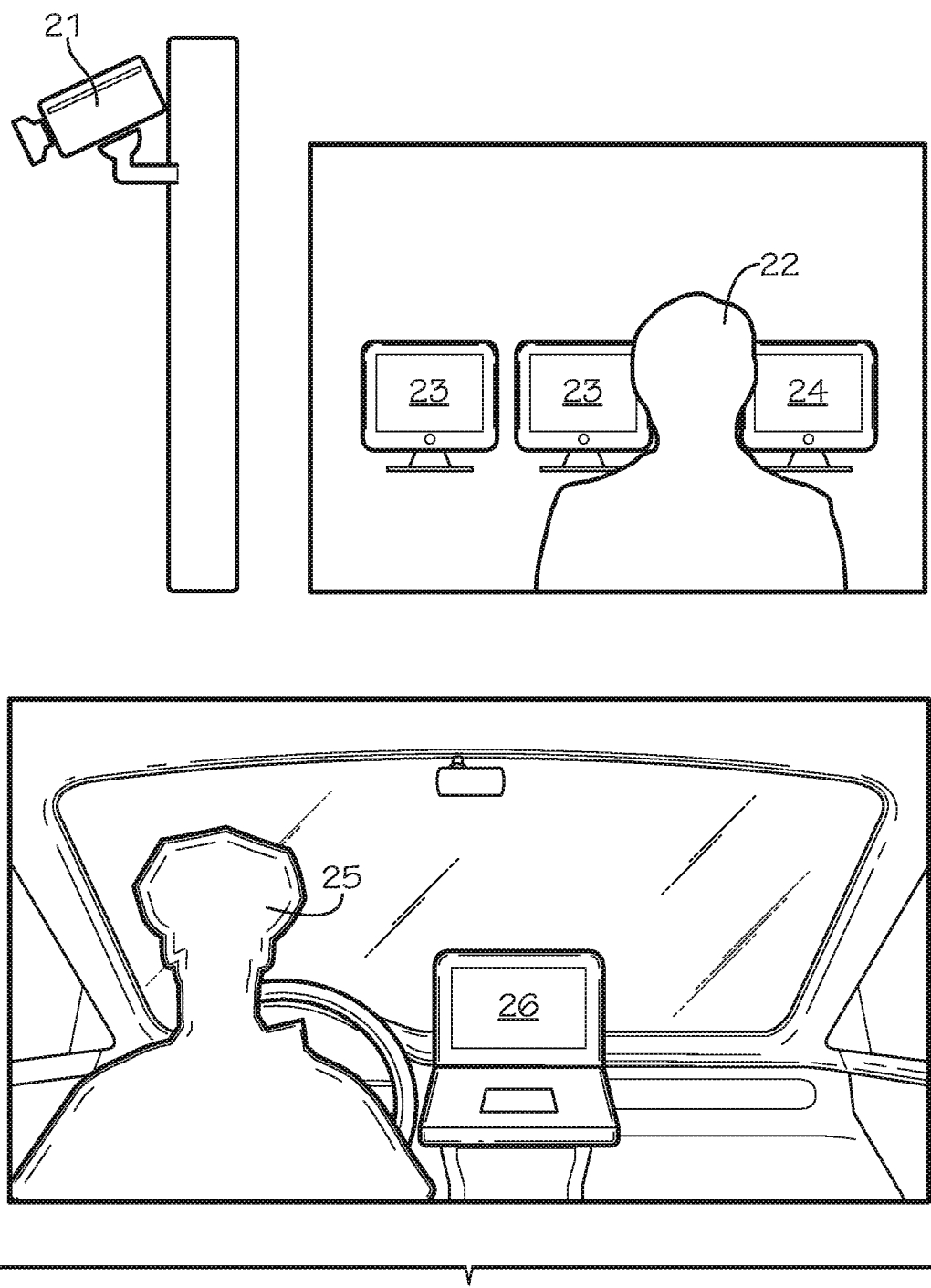
FIG. 3 is a schematic view of a fixed location video, audio, and/or metadata legal evidence collection device where an incident can be originated after observation by a central dispatcher, an officer in a vehicle or on foot, or by another method of manual initiation according to an exemplary embodiment of the present disclosure.

FIG. 3 illustrates an exemplary schematic view of a fixed location video, audio microphone, and/or metadata collection device 21, a central dispatch facility including a central dispatcher 22 and a police officer 25 in a remote vehicle that is separate from the central dispatch facility including display screens 23. An incident can be originated after observation by the central dispatcher 22, by the officer 25 in the remote vehicle (or on foot), or by another method of manual initiation. Video feeds from issued equipment or third-party cameras 21 may be fed to the central dispatcher 22, who may review the video feeds on screens 23 and originate an incident using computer-aided dispatch screen 24. Also, an officer 25 in a vehicle or on foot looking at a display screen 26, may initiate an incident, which may start recording and notify central dispatcher 22 of the incident as described below.

In an aspect, once real-time device locations are displayed on a map-based situational awareness system, central dispatcher 22 and other authorized system users may be able to right-click on a mobile or fixed location device icon or otherwise initiate a real-time video and/or audio stream from the device. This allows central dispatchers and other system users to see real-time video feeds and/or listen to real-time audio feeds from any device that is involved in the incident. As an example, a central dispatcher 22 in the central dispatch, a supervisor in another patrol car, a SWAT team leader in an incident command vehicle, a dispatcher in a statewide emergency management agency, FEMA, DHS, or another authorized system participant could see the real-time location of all devices (and therefore police officers, other first responders, and vehicles) involved in an incident, and view streaming video and/or listen to streaming audio from a vehicle video camera, an officer personal body camera, a third party fixed location video cameras 21, or from another video, audio, and metadata capture and streaming device with broadband internee connectivity.

In one embodiment, screens 23 may present map-based displays that show the location of all devices in relation to all other devices involved in the incident, and also in relation to the location of nearby third party devices that may not have an incident beacon processing capability. As described in more detail below, a device may send an incident message or incident beacon out to initiate recording by other devices in the vicinity of the incident. An example of a device that may not process these incident beacon messages is a third party fixed location video camera that is not managed or controlled by a police agency or other government entity. The police agency may have a memorandum of understanding with the third party owning the camera to receive a live video stream from the third party video camera on demand. For example, the agreement may allow the police agency or government entity to view and/or record the video stream when an active incident is occurring within an agreed-upon range of the third party camera 21. To minimize data storage requirements, the police agency or government entity also may choose to only store or record video feeds when an active incident is within range of the third party camera 21. In these examples, a vehicle or mobile device beacon message may not be able to directly initiate viewing or recording from the third party video camera 21.

The vehicle or mobile device may report its own location to the central dispatcher and other devices, which may trigger the creation of a GeoFence entry event in a dispatcher situational awareness or mapping system. In one embodiment, a GeoFence around a third party camera device location may be pre-defined, and a GeoFence entry event could cause the video feed from the third party camera to be automatically displayed on a display screen 23 in a video integration center, and made visible as one of many screens being displayed to a dispatcher 22. Therefore a central dispatcher 22 in a video integration center would not have to take any manual action to determine which third party fixed location cameras were in the current vicinity or projected route of travel of the incident, or find and lookup relevant third party cameras, or initiate the display of a video feed from the third party camera as a beaconing vehicle or mobile device passed by the third party video camera. Instead, while a beaconing device is located within a pre-established GeoFence around a third party camera, the central system could trigger recording and/or display of the third party data feed without a manual request from a dispatcher 22. Once the vehicle or mobile device moves out of a pre-established GeoFence around the third party video source, the dispatcher situational awareness or mapping system could generate a GeoFence exit event to turn off the live feed from the third party video source, stop recording, and/or stop displaying the live feed.

Accordingly, in one embodiment, a police officer may pursue a suspect and approach a third party camera feed, and a video integration center could automatically display the third party video feed so a video integration center dispatcher could watch events as the suspect and officer approached and then left the view area of the third party video camera. The central dispatcher may, in one embodiment, be presented with display screens of only video feeds that were currently relevant to an event. In the case of a high speed chase with many third party cameras located along the route of travel, a central dispatcher is not likely to be able to keep up with switching between various cameras as the incident travels into each location area where the third party video feed becomes relevant to the incident.

However, pre-establishing GeoFence polygons around fixed location video, audio and metadata generating devices combined with situational awareness systems that can generate GeoFence entry and exit events as devices enter and exit GeoFence polygon zones can automatically activate, display, and record video, audio, and metadata legal evidence from all other devices that are within the vicinity of the incident, regardless of the location of where the incident originated or changes during the course of the incident. In this way, the system can automatically track the progress and direction of a beaconing vehicle or mobile device involved in a pursuit, automatically activate and display video feeds from directly owned and third party video camera feeds along the way as the pursuit progressed, and capture video, audio and metadata from third party camera locations that were directly relevant to an incident.

As other examples of initiating an incident, a 911 call center system, license plate reader, national incident alert system, or other system may receive an automatic incident notification message, a dispatcher may determine that an incident is in progress by monitoring radio call traffic, or a dispatcher or 911 operator may receive a call, email, text, or social media message from a citizen. The central dispatcher may initiate the broadcast of an incident beacon message to a beaconing device that is closest to the reported incident location, from which all devices within range of the incident location may be triggered to participate in video, audio, and metadata legal evidence capture for the incident.

It is important to note that 911 and other systems integrated with the video management system may be able to automatically initiate messages and beacons to legal evidence personal video, audio and/or metadata recording collection devices. A 911 system may automatically send a message with a call address and GPS coordinates to the system that would automatically establish a GeoFence zone around the call location. So without requiring any manual human intervention from a 911 dispatcher, a policy-based recording decision may be the responding officer's body-worn recording device will automatically start recording when the officer enters the Geofence zone established around the 911 call location.

It is also possible to use "Big Data" analytics of crime history data, 911 call data, temperature data, and other data sources to automatically determine dates, times, and locations where an officer's body-worn video recording device should automatically start recording even in the absence of a 911 call or other explicit recording trigger. Big Data analysis algorithms may identify high risk times and areas where an officer's body-worn camera should be recording without any explicit manual or system input. Certainly the scope of this invention contemplates such a capability.

In addition, vehicle servers, personal body cameras, wireless microphones, and other mobile devices engaged in an incident may report real-time metadata such as current location and status metadata, as well as selectively stream video and audio data, to central situational awareness command and control dispatch systems and centers, video integration centers, and back to vehicle servers, other personal body cameras and other mobile devices involved in an incident. This allows real-time visibility and a map-based view of the location and status of all devices that have become involved in an incident. An example would be real-time location and status reporting from a personal body camera to a vehicle laptop or tablet display screen, so an officer in a vehicle would be able to see the real-time location of his partner who was involved in a foot chase and is now beyond visual view from the vehicle. For example, in FIG. 3 an officer 25 may have a partner who has engaged in a chase away from the vehicle, and the partner's location may be displayed on display 26.

The location may be tracked, for example, using a global position system (GPS) chip embedded in the officer's video recording apparatus, which may be, for example, a smartphone. In one embodiment, the mobile device may automatically and continuously broadcast location and status metadata without any manual effort or intervention from the officer, so the officer would not have to take the time and attention to talk into his voice radio to attempt to describe where he was currently located, and the direction of travel if in motion, or otherwise perform some manual action to provide location and other status metadata to dispatchers, other police officers, supervisors, and other relevant parties. Pursuit situations are already inherently dangerous. Police officers and other field personnel should not be distracted by having to perform location identification and reporting tasks that a device can do and report automatically. Accordingly, in one embodiment, location and other status metadata from vehicle and mobile devices may be automatically and continuously reported without requiring any manual intervention from an officer. This information may be displayed, for example, on display screens 26 in vehicles or for a central dispatcher on screens 23.

Figure 4:
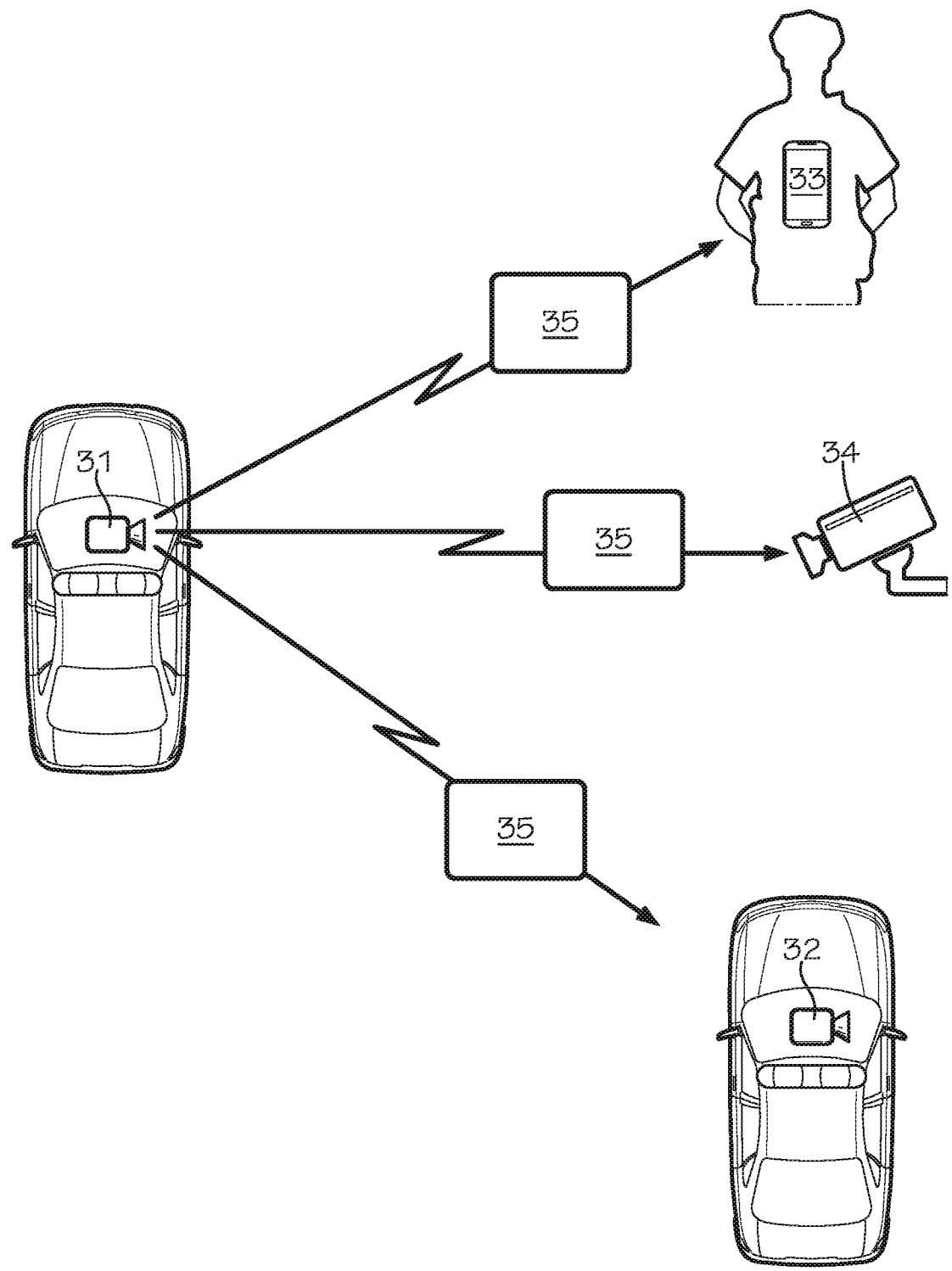
FIG. 4 is a schematic view of a vehicle device broadcasting beacon messages to initiate data capture in nearby vehicle, mobile, and fixed location devices according to an exemplary embodiment of the present disclosure.

FIG. 4 illustrates an exemplary schematic view of a vehicle device 31 broadcasting beacon messages 35 to initiate data capture in nearby vehicle video, audio, and/or metadata capture system 32; a mobile video, audio and/or metadata collection device 33, and/or fixed location video and audio recording device 34. The devices 31-34 may have local storage capacity, local area network communications capability, and/or wide area cellular or satellite communications capability. As a result, data may be retained by the system even if a device, such as the video, audio and/or metadata collection device 33 travels outside the range of local wireless communications with a vehicle server. At a later time after the data is collected, the device can transfer the stored data back to the vehicle server where it can be added to the integrated data stream for the incident. Once the integrated data stream from all wired and wireless sources is stored on the vehicle server, it can then be transferred to a second location such as a video management system that stores integrated data streams for all incidents from all vehicles in the fleet as the repository of all legal evidence.

In addition, a personal body camera 33 or other mobile wireless recording device 32 may use a wide area network cellular, satellite, or local WiFi internet connection to transfer video, audio, and metadata directly back to the central video management system, where it can be combined into an overall integrated data stream for the incident. This storage and/or wide area communications capability means that wireless recording devices can capture and retain video, audio, and metadata legal evidence at any distance from the vehicle server, far outside the range of local area network communications, with assurance that the video, audio, and metadata can later be added into the overall incident integrated data stream. This process may be accomplished using an incident identifier that is included with an initial beacon message 35 upon detecting an event or initiating recording. The incident identifier may be any combination of characters or numbers used to identify an incident, and may, in one embodiment, be stored as part of packet headers embedded in video.

In one embodiment, a mobile device 33 may start off within local area network communications range of a vehicle server, but then move out of local area network communications range. An example is when an officer exits a patrol car and goes on a foot chase pursuing a suspect, the officer may move out of local area network communications range of the vehicle server. In another example, an officer's partner takes the patrol car in pursuit of a suspect vehicle and leaves the first officer with one or more suspects at the location of an initial traffic or DUI stop. It is possible for a citizen vehicle involved in an incident to be stopped at a location, but at some point two or more citizen occupants of the vehicle flee and go in different directions, becoming increasingly distant from the vehicle and from each other, and all out of local area network communications range of each other. As a result, an incident can spread across multiple distant locations over time and exceed the range of local area network communications.

Devices that come within the local area network communications range of an active incident may receive an incident identifier message through beacon 35 that indicates that an incident is in progress from a device that is already participating in the incident. In addition, the incident identifier may also be sent to other devices along with location tracking information through a wide area network cellular and/or satellite connection. The message may be sent directly to devices or relayed to another local area network such as a city-wide mesh and WiFi network to communicate the unique incident identifier to other mobile devices that are already within or travel within range of one or more vehicle servers, personal body cameras, or other mobile devices that are already capturing data from an incident in progress. The incident identifier and location metadata notification process therefore causes other nearby devices that are out of initiating trigger vehicle server local area network communications range to initiate recording. In addition, in one embodiment, the notified devices may save buffered pre-event recording video, audio, and/or metadata as soon as they receive an incident identifier notification.

As a result, in one embodiment, as the incident progresses and possibly spreads across several locations, devices that are currently capturing data for the incident may notify other nearby devices that an incident is in progress, so that other mobile and fixed devices within the vicinity of the incident also retain pre-event data and start capturing video, audio, and metadata. An example might be an officer with a personal body camera who is on a foot chase after a suspect, which moves the officer and his personal body camera outside of local communications range of the officer's police car server. However, now the officer and his personal body camera have moved within location communications range of other officer personal body cameras, vehicle servers, fixed location cameras, and other devices that were not aware of and were not engaged in the incident in progress. A beacon 35 may provide notification of an incident in progress to other now nearby devices. The devices may trigger alerts such as audio tones, warning light illumination and flash patterns, and/or vibrations to personal body cameras, wristband controller, key fob, cell phones, and other worn or vehicle devices in the area. In addition, devices receiving the notification may start recording using the incident identifier included in the beacon 35, including, in one embodiment, buffered pre-event recording data.

During the course of a dynamic incident, recording devices at various locations and times will be within local communications range of other devices that are already involved in recording data for the incident. The resulting video recorded by these devices may include a common incident identifier, allowing the videos to be logically tied to the incident as part of an integrated data stream of video, audio, and metadata. As a result, in one embodiment, the integration of video may occur on an ad hoc and autonomous basis as an incident evolves, without requiring any advance "registration" or other advance coordination and setup, or manual intervention or action, between the video, audio, and metadata collection devices that become relevant to an incident based upon their location.

Beaconing 35 may be broadcast on one or more local area or wide area networks such as Zigbee, WiFi, cellular, and other communications networks. Other fixed location and mobile devices that are part of the overall system may listen for incident beacon messages. The first mobile or fixed location device that becomes involved in an incident through some kind of triggering event may start broadcasting a beacon message 35 with, for example, a unique incident identifier, current location, time, and other metadata about the incident. If a device receives a beacon message about an active incident that is within a set range of the device's current location, this new device retains the incident identifier, and joins the incident. If the device is not recording already, it may start recording video, audio and metadata including the received unique incident identifier, just as if it had directly received a trigger event. If the device is already recording, the recording may be stored with the incident identifier. The new device may, in one embodiment, also retain pre-event video, audio, and metadata, and associate the pre-event data with the unique incident identifier.

The new device may also re-broadcast an incident beacon message with the unique incident identifier, and the message may also include other information such as the new location of the new device and other metadata to alert other nearby devices to also join the incident. The message may also include the location of the originating device that sent the initial beacon message. An algorithm may combine the distance from the location of the originating device plus the location of the current device to prevent a runaway initiation where all devices cascade and get added to the incident regardless of their distance from the device that originated the incident.

For example, devices within a two mile radius may be added to an incident. An initial device may broadcast a beacon message to a second device half a mile away, which may rebroadcast the beacon message with the incident identifier to a third device another mile away from the initial device. These devices, which are all within a mile and a half of the original device in this example, may be added to the incident. However, a fourth device may be another mile away from the third device (i.e., two and a half miles from the original device), and therefore may not be added to the incident because it is more than two miles away from the original device. In this way, devices within a set distance of any other device involved in an incident automatically become involved in the incident without requiring any direct triggers or human intervention.

While example distances have been provided, other distances may be used, and the distance selected may also be configured based on the incident itself. For example, a high-speed vehicle chase may require a larger radius to include additional recording devices compared to a foot chase. In one embodiment, the central dispatch or an in-vehicle unit may set the distance from the originating device for inclusion in an incident, which may change as an incident unfolds. The distance therefore may be predefined or configurable, including through a message transmitted to devices in the system.

Once a device receives a valid incident beacon message, it may also start transmitting incident location, status and other metadata internet messages over one or more cellular networks, mesh networks, Zigbee networks, and authorized WiFi access points. This information may be transmitted to, for example, situational awareness mapping systems, computer aided dispatch systems, video integration center systems, and other local and cloud-based systems to display icons and metadata on computer map and report screens that provide overall situational awareness of the devices that are engaged in an incident.

Figure 5:
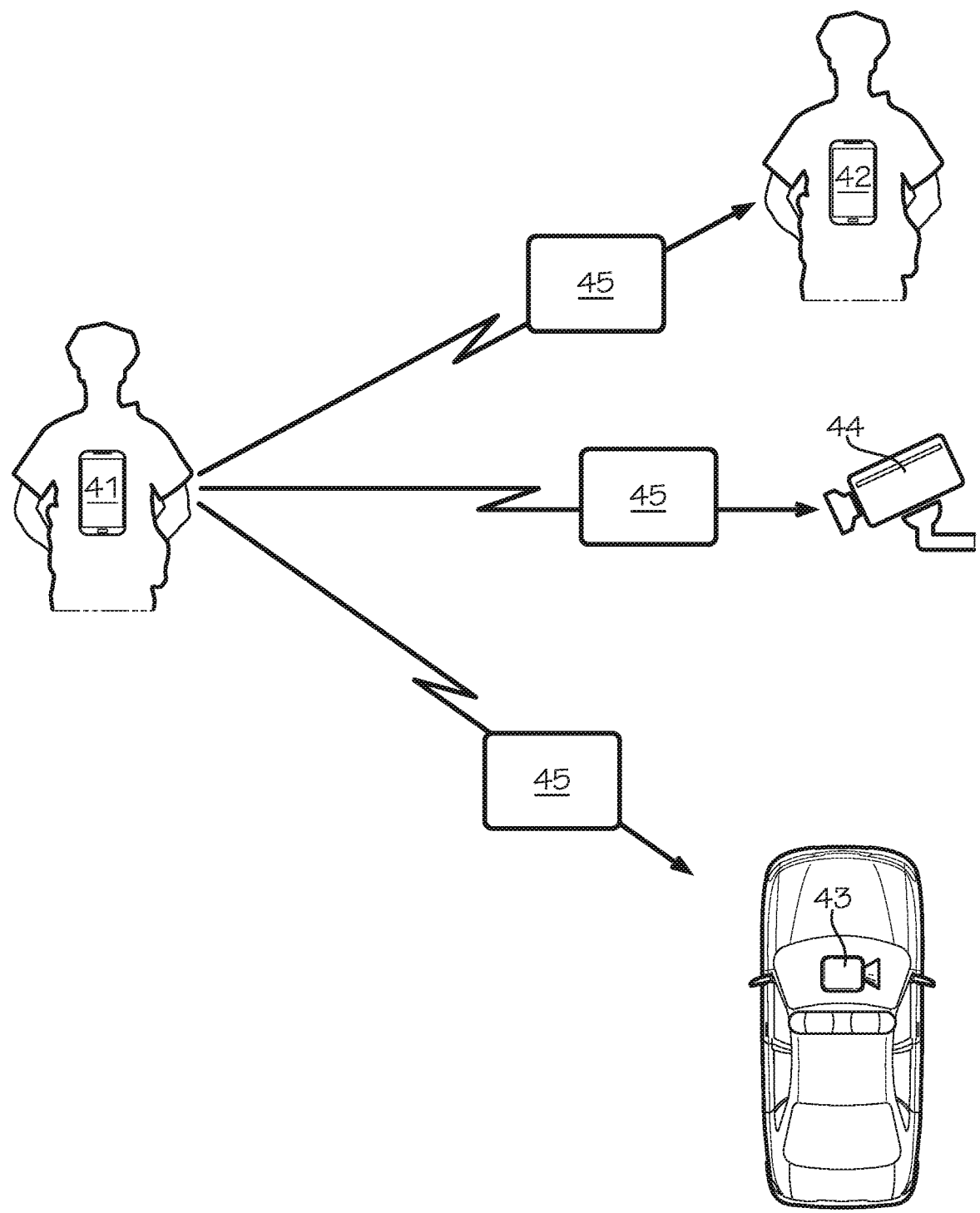
FIG. 5 is a schematic view of a mobile device broadcasting beacon messages to initiate data capture of live data plus any pre-event content in nearby vehicle, mobile, and fixed location devices according to an exemplary embodiment of the present disclosure.

FIG. 5 illustrates an exemplary schematic view of a mobile device broadcasting beacon messages to initiate data capture of live data plus, in one embodiment, any pre-event content in nearby vehicle, mobile, and fixed location devices. Referring to FIG. 5, a mobile device 41 broadcasts beacon messages 45 to start data capture in nearby vehicle video, audio and/or metadata capture device 43; a mobile video, audio, and/or metadata device 42; and/or fixed location video and/or audio capture device 44 if they are not currently recording. If one or more of devices 42, 43, and/or 44 are currently recording and have pre-event buffering capability, the pre-event buffer video, audio and/or metadata contents may be included in the integrated data stream. FIGS. 4 and 5 together illustrates that the initial beacon message may be broadcast from a variety of different devices along with an incident identifier.

Figure 6:
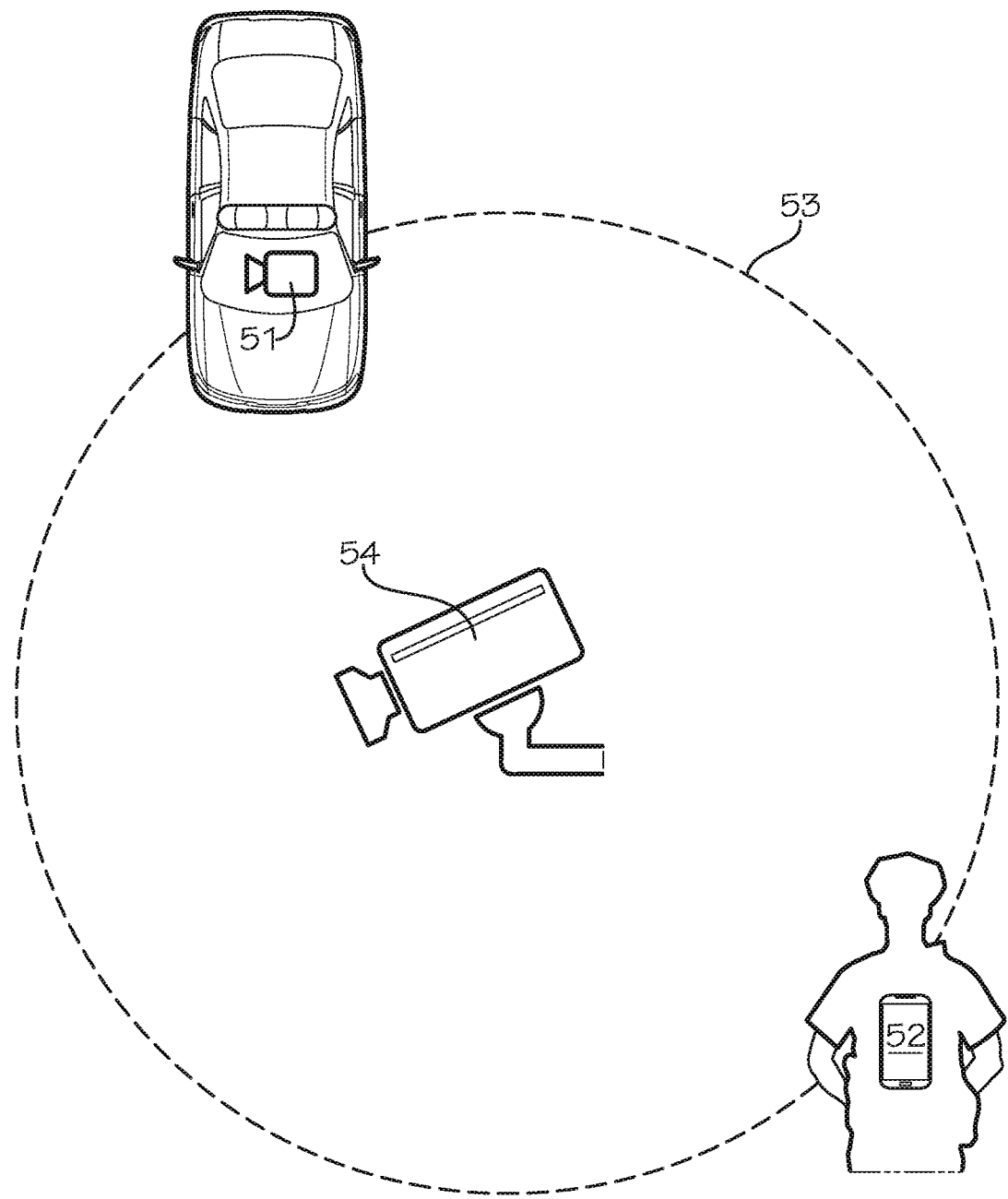
FIG. 6 is a schematic view of a vehicle or a mobile device entering and exiting a entity-owned or third party owned fixed location video and/or audio data collection device GeoFence, which generates a GeoFence entry or exit event, which initiates and then stops a fixed location video and/or audio feed, view and/or capture, according to n exemplary embodiment of the present disclosure.

FIG. 6 illustrates an exemplary schematic view of a vehicle or a mobile device entering and exiting a entity-owned or third party owned fixed location video and/or audio data collection device GeoFence, which generates a GeoFence entry or exit event to initiate and then stop a fixed location video and/or audio feed, view and/or capture. Referring to FIG. 6, a vehicle video, audio, and/or metadata legal evidence capture device 51, or a personal body camera or other mobile video, audio, and/or metadata capture device 52, entering or exiting a GeoFence 53 around a fixed location entity-owned or third party owned video, audio and/or metadata data capture device 54, will generate a GeoFence entry or exit event. A GeoFence entry event will initiate the display and/or capture of an integrated data stream from fixed location device 54 when the vehicle device 51 or mobile device 52 enters the GeoFence 53. In one embodiment, the GeoFence entry event will also trigger the retention of any buffered pre-event content being stored by fixed location video, audio, and/or metadata capture device 54. A GeoFence exit event from vehicle device 51 or mobile device 52 will terminate the video and/or audio feed view and/or capture from fixed location device 54, The GeoFence entry and exit events may be transmitted to or from other devices in the system, including worn video cameras, vehicle control units, central dispatch units, and others, using local or wide area communications.

Figure 7:
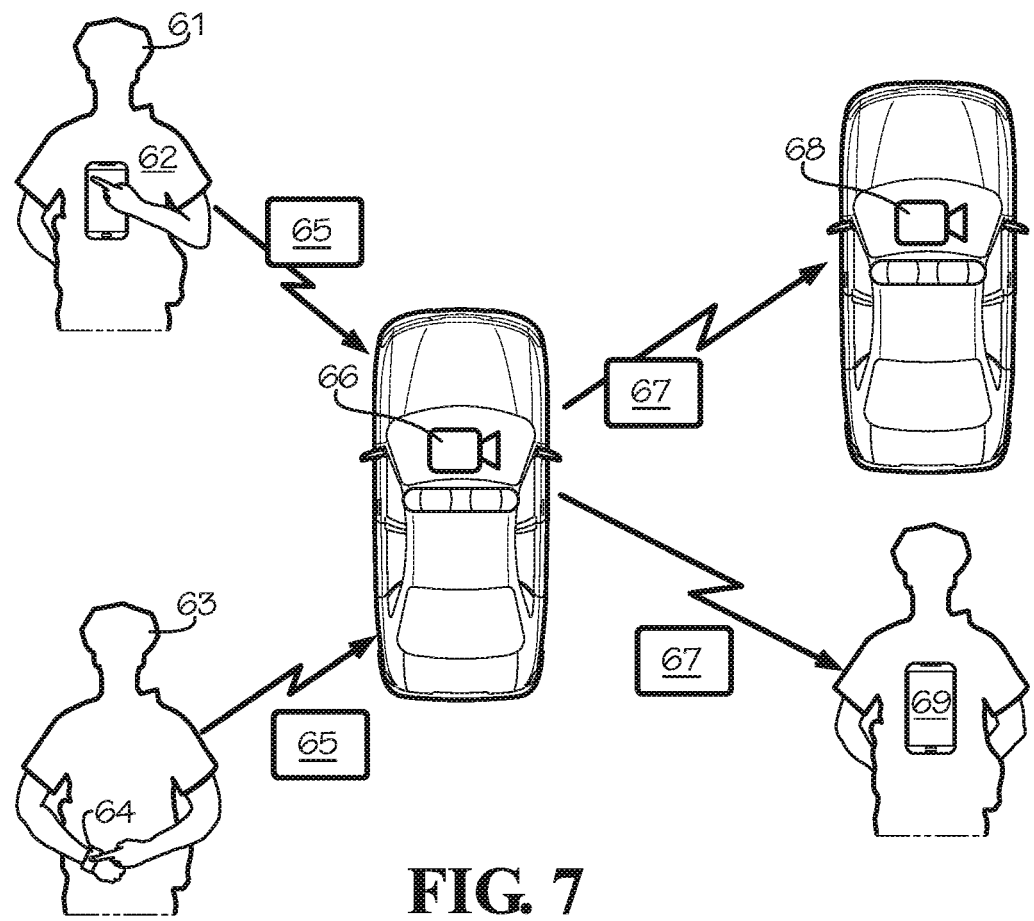
FIG. 7 is a schematic view of a vehicle or mobile device initiating a beacon message after receiving a discreet signal from a wireless key fob, wristband, cell phone, or other device key or button press according to an exemplary embodiment of the present disclosure.

FIG. 7 illustrates an exemplary schematic view of a vehicle or mobile device initiating a beacon message after receiving a discreet signal from a wireless key fob, wristband, cell phone, or other device key or button press. Referring to FIG. 7, an officer 61 manually presses a button on a personal body camera device 62, or an officer 63 manually presses a button on a wristband controller device 64, both of which will initiate the transmission of an alert message 65 to a patrol vehicle 66 with a vehicle video, audio, and metadata capture and wireless vehicle router device 67.

The vehicle device 66 may transmit a beacon message 67 that can be received by an officer mobile video, audio, and/or metadata capture device 69 that is within local area communications range. The beacon message 67 can also be received by a vehicle device 68 that is within local area communications transmit range. In both instances, the vehicle device 68 and the personal body camera device 69 may be triggered to start recording video, audio, and metadata if they are not recording already. If device 68 or device 69 has a pre-event buffer capture capability, the pre-event buffer contents may be included in the video, audio, and metadata integrated data stream.

Figure 8:
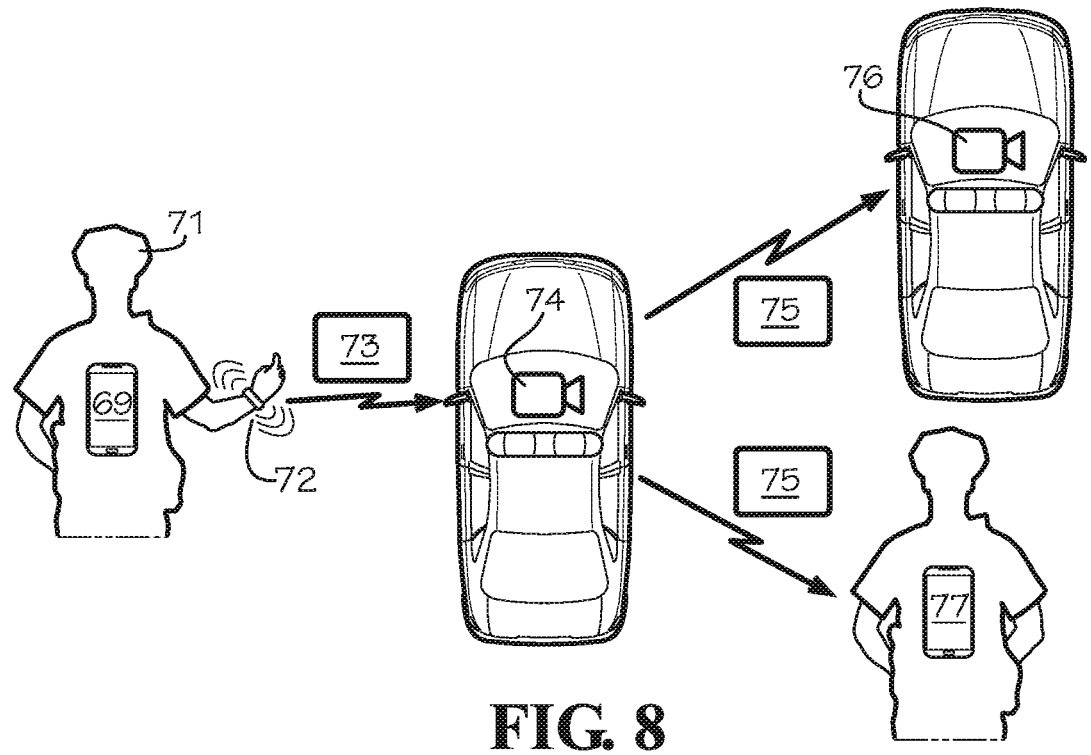
FIG. 8 is a schematic view of a vehicle or mobile device initiating a beacon message after receiving a discreet signal from an accelerometer or other motion sensing capability equipped wireless key fob, wristband, cell phone, personal body camera, or other device, where the officer initiates a gesture or shake movement of the wireless key fob, wristband, cell phone, personal body camera or other mobile device according to an exemplary embodiment of the present disclosure.

FIG. 8 illustrates an exemplary schematic view of a vehicle or mobile device initiating a beacon message after receiving a discreet signal from an accelerometer or other motion sensing capability equipped wireless key fob, wristband, cell phone, personal body camera, or other device, where the officer initiates a gesture or shake movement of the wireless key fob, wristband, cell phone, personal body camera or other mobile device. Referring to FIG. 8, an officer 71 wearing a wristband controller or other device 72 with a three axis accelerometer capability makes a designated arm gesture or shake movement of the wireless key fob, wristband, cell phone, personal body camera or other mobile device 72, which triggers the device 72 to transmit an alert message 73 to a vehicle with a vehicle video, audio, and metadata capture and wireless vehicle router device 74.

Once the vehicle device 74 receives the alert message 73, it will formulate a beacon message 75 and broadcast beacon message 75. A vehicle with a vehicle video, audio, and metadata capture and wireless vehicle router device 76 or personal body camera 77 that receives the beacon message 75 is triggered to start recording video, audio, and metadata if they are not recording already. If device 76 or device 77 has a pre-event buffer capture capability, the pre-event buffer contents will be included in the video, audio, and metadata integrated data stream. While an example of a wrist band controller 72 has been provided, other devices may also include accelerometers, such as a personal body camera 77, that can register motion, trigger video and/or audio recording, and transmit a beacon message.

Figure 9:
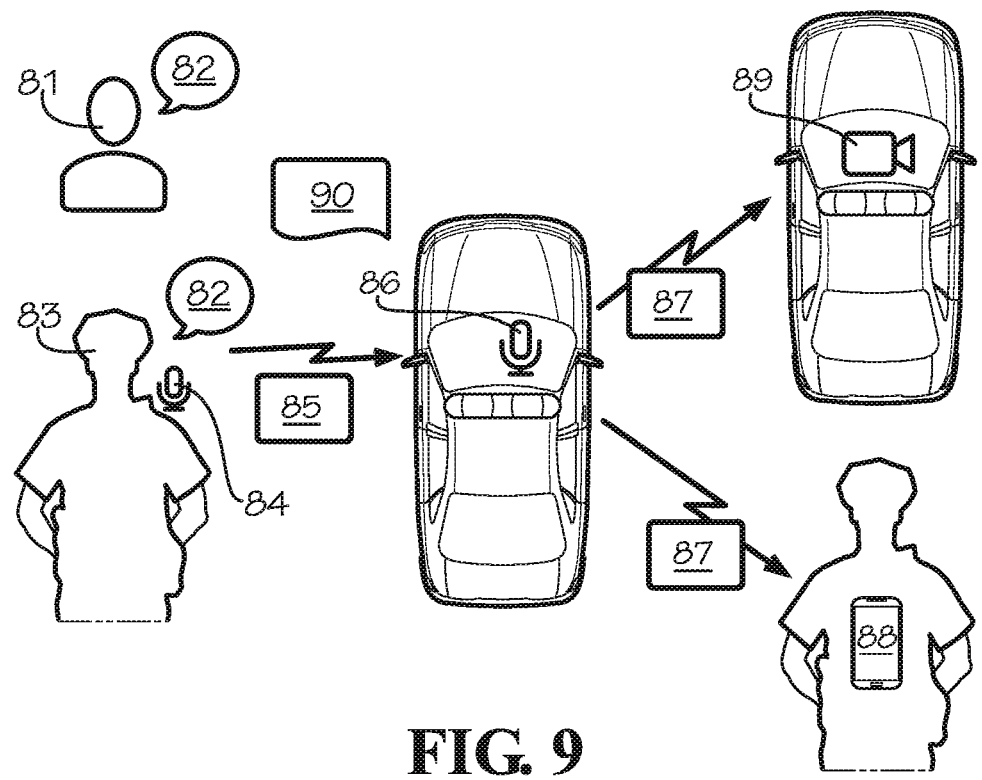
FIG. 9 is a schematic view of a vehicle or mobile device initiating a beacon message after a device microphone with a voice recognition capability recognizes a word from a list of pre-stored keywords spoken by an officer or citizen in the vicinity of the mobile device according to an exemplary embodiment of the present disclosure.

FIG. 9 illustrates an exemplary schematic view of a vehicle or mobile device initiating a beacon message using voice prompts. Referring to FIG. 9, a citizen or bystander 81 at a vehicle stop or an officer 83 makes a comment 82. The comment may be detected by personal body camera 84, and speech recognition technology may recognize a spoken word from a list of keywords 90 and generate an alert message 85. A vehicle microphone 86 might also use speech recognition technology to recognize a spoken word from a list of keywords 90. In response to the voice command, the mobile device 84 or vehicle device 86 may initiate a beacon message 87, and transmit the beacon message 85. A different officer personal body camera 88 or vehicle device 89 may receive the beacon message 87, and either or both are triggered to start recording video, audio, and metadata if they are not recording already. If vehicle device 89 or personal body camera device 88 have a pre-event buffer capture capability, the pre-event buffer contents may be included in the video, audio, and metadata integrated data stream.

Figure 10:
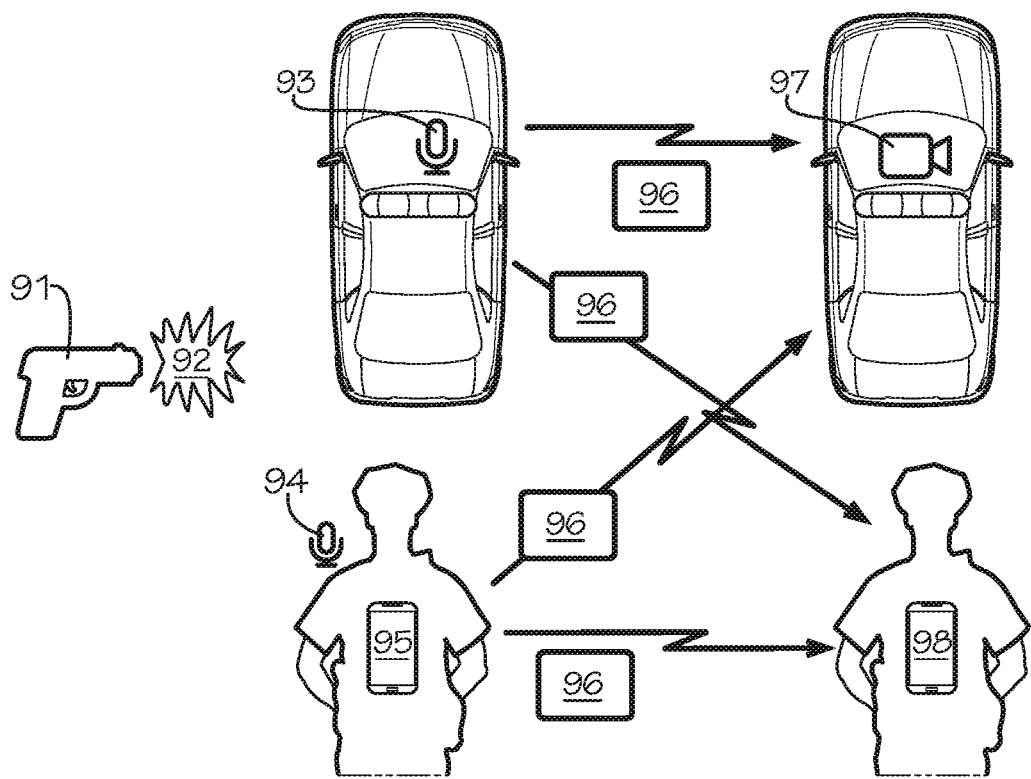
FIG. 10 is a schematic view of a vehicle or mobile device initiating a beacon message after a microphone recognizes a sound of a minimum decibel threshold and in the frequency range of a gunshot according to an exemplary embodiment of the present disclosure.

FIG. 10 illustrates an exemplary schematic view of a vehicle or mobile device initiating beacon message after a microphone recognizes a sound, such as a minimum decibel threshold and in the frequency range of a gunshot. Referring to FIG. 10, a gun 91 is fired and generates sound waves 92 in the frequency range of a gunshot that exceed a minimal decibel threshold. A vehicle microphone 93 or a wireless microphone or personal body camera 94 may detect the sound. A vehicle video, audio, and metadata capture and wireless vehicle router device 93 or a personal body camera device 94 may determine that a gunshot within a minimum distance of the vehicle has occurred. The vehicle device 93 or the personal body camera device 94 creates and broadcasts an incident start beacon message 96 in response to detecting the gunshot or other defined sound.

The beacon message 96 may be received by the video, audio, and metadata capture and wireless communications device 98 or the personal body camera device 97. Vehicle devices 97 and/or the mobile personal body camera devices 98 within local area network communications range are triggered to start recording video, audio, and metadata if they are not recording already. If vehicle devices 97 and/or mobile personal body camera devices 98 have a pre-event buffer capture capability, the pre-event buffer contents may be included in the video, audio, and metadata integrated data stream.

Likewise, if a separate gun shot location audio triangulation system determines that a gunshot has occurred, the location and other metadata about the gunshot can be passed to a computer-aided dispatch or other situational awareness management and tracking systems. One or more of these computer-aided dispatch or other situational awareness management and tracking systems could then generate an incident beacon message, and then transmit the beacon message 96 over local area networks, wide area cellular networks, and even satellite wide area networks to all vehicle devices 97 and mobile personal body camera devices 98 that are currently located within a set distance of the location of the gunshot, as determined by the audio triangulation gun shot location identification system.

Figure 11:
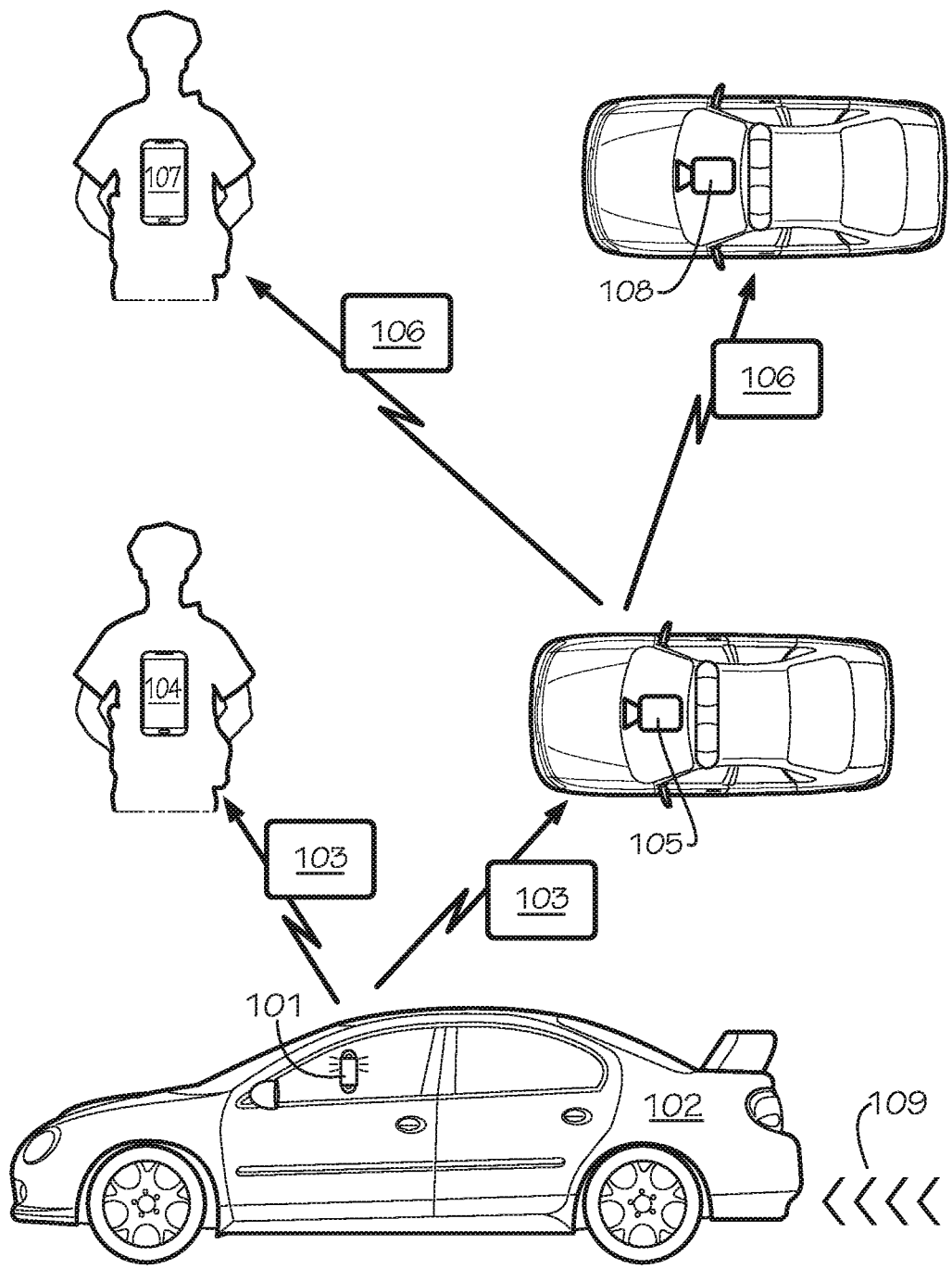
FIG. 11 is a schematic view of a mobile video device temporarily affixed to a citizen vehicle during a vehicle stop initiating a beacon message after the mobile device detects motion such as the vehicle starting to move or unauthorized attempts to remove the mobile video device from the vehicle according to an exemplary embodiment of the present disclosure.

FIG. 11 illustrates an exemplary schematic view of a mobile video device temporarily affixed to a citizen vehicle during a vehicle stop initiating a beacon message after the mobile device detects motion, such as the vehicle starting to move or unauthorized attempts to remove the mobile video device from the vehicle. Referring to FIG. 11, a mobile officer safety video capture and location messaging device 101 is temporarily affixed to a citizen vehicle 102 during a vehicle stop. The mobile officer safety video device 101 will initiate an alert message 103 if the mobile device 101 detects motion 109, which may indicate citizen vehicle 102 starting to move or unauthorized attempts to remove the mobile video device 101 from citizen vehicle 102.

The alert message 103 may be received by officer personal body camera 104 or vehicle video, audio, and metadata capture and wireless vehicle router device 105 and cause the generation of an incident beacon message 106. The beacon message 106 may be transmitted to all officer personal body camera devices 107 and vehicle video, audio, and metadata capture and wireless vehicle router devices 108 that are within, for example, local area network communications range. The vehicle video, audio, and metadata capture and wireless vehicle router devices 108 would also transmit a beacon message 106 over wide area network cellular or satellite data communications to alert computer-aided-dispatch and other situational awareness tracking systems that a citizen has attempted to remove the officer safety device 101 from the vehicle, or is attempting to flee the location of the traffic stop 109. In either case, the stop may be automatically escalated to an increased incident severity class that is now or soon will be moving away from the location of the initial stop. The various systems can then start tracking the location and progress of citizen vehicle 102 as it flees in the direction of other vehicle, mobile, and fixed location video, audio and metadata collection devices 104 and 105, as well as fixed location video, audio, and metadata devices that were not within range of the incident. The various systems can send beacon messages 106 to those devices at locations that will soon be passed by the citizen vehicle 102 that has an officer safety device 101 still affixed to the vehicle.

Figure 12:
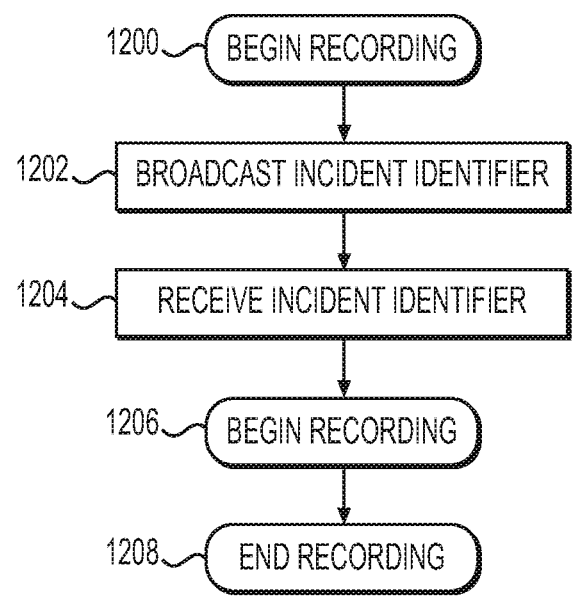
FIG. 12 illustrates an exemplary method consistent with certain exemplary embodiments of the present disclosure.

FIG. 12 illustrates an exemplary method consistent with certain embodiments. At step 1200, a device in the system may begin recording. As described herein, recording may begin on a number of different devices, including a personal body camera of an officer, a camera in or on a vehicle, a third-party camera, a fixed-location surveillance camera, or another recording device. Recording may begin in response to the command of a person through manual entry, such as an officer pressing a button on a particular device. In other embodiments, recording may begin automatically in response to a predetermined event, such as in response to a voice command, the sound of gunshot, in response to a vehicle accelerating rapidly or stopping suddenly, when a citizen vehicle has been pulled over but attempts to flee, when an officer turns their vehicle emergency response lights or sirens on, upon receiving a command from a central office to record, and in other situations.

At step 1202, the device that began recording may create and broadcast an incident identifier. The incident identifier may be broadcast over a variety of local area network connections, including, for example, Bluetooth, Zigbee and others. In addition, satellite or wide area network communications may send the incident identifier to a central dispatch location, vehicles and recording devices located outside the local area communication network range, or other devices. The central location or device receiving the incident identifier over a wide area network communication network may identify other devices within a given vicinity of the device that transmitted the incident identifier and manually instruct other devices in the vicinity to begin recording. For example, a third party or fixed-location surveillance camera may be manually instructed by the central location or device, or a network operations center (Situational Awareness Command and Control Dispatch Center, Video Interpretation Center, etc.) to begin recording or to save video, emails or other data that is already being recorded.

The incident identifier may be transmitted along with other information, including the location of the initial device that transmitted the incident identifier, and other information such as a time and date. The message may be sent using one-way communications, such as UDP, or a two way communication TCP/IP that receives confirmation of the message. For example, a personal body camera of an officer may send an incident identifier to the officer's vehicle (which includes a server), which may transmit a confirmation message back to the camera indicating that the incident identifier was received. If no confirmation message is received, the camera may continue to transmit the incident identifier for a given period of time, indefinitely throughout an incident, or until confirmation is received.

At step 1204, another device may receive the incident identifier. The incident identifier may be sent along with a request to save pre-event buffered data by devices receiving the message. Alternatively, devices may automatically save pre-event buffered video when the device supports that feature. Devices within a predefined or selected range of the original initiating device that initially broadcast the incident identifier determines whether such devices are within range of the original device and, if so, may begin recording. For example, a GeoFence zone established around the initiating device may define a half mile radius so that all devices within a half mile radius of the initiating device will be within range so as to record video, audio and/or metadata and will initiate a beacon. In addition, a GeoFence zone around fixed-location cameras, including third-party security cameras, may allow automatic display and/or recording of video, audio and metadata by the fixed-location cameras when an incident moves within a certain distance of the fixed-location cameras.

In the example of using a half mile radius, that radius may be maintained as an incident progresses away from an initial location. For example, during a vehicle or foot chase, new devices that are within the half mile radius of the initiating device, whether at its original or new location, will receive the beacon signal, determine that they are within the set range, and also begin recording. A half mile radius is just one example, as other distances may also be used. Further, the incident identifier may be initially broadcast not only to other local devices but also to a central dispatch location. The central dispatch system may then notify devices within the GeoFence of the incident and incident identifier using cellular, other wide area network communications, or satellite communications, allowing those devices to also begin recording. Thus, there is no need for any registration or set up in advance.

At step 1206, the receiving devices may begin recording audio and/or video, or if a device was already recording, it may begin saving the audio and/or video. Hence, by step 1206, the beacon receiving device has determined that it is within range and begin recording and send a beacon signal. The audio and/or video and/or other metadata may be saved with the incident identifier. It may also include other information, such as an indication of the location of the receiving device, the location of device that initially sent the incident identifier, a date, or a times amp to assist with accurately matching a recorded video segment with other video recorded for the incident.

At step 1208, the devices may end recording. All or some of the devices may end recording based on a recognition that it is no longer in range, or based on a message broadcast from the initiating device or another device, including the network operations center. Some devices may be notified that recording can cease while others associated with an incident remain recording. For example, a stationary third-party camera may not need to continue saving its video after the incident has progressed away from the camera, although other cameras will continue recording. In addition, devices may stop saving recorded video based on other criteria, such as a predetermined amount of time passing.

As one example, once the originating device stops recording, indicating the incident has been concluded, an incident termination beacon message may be broadcast over local area and wide area network communications to cascade the incident termination beacon message to all other devices that have become involved in the incident in some way. A device may also terminate recording when it or the incident moves out of range of an area designated as a GeoFence around the incident. An incident termination beacon message could also be broadcast by a central video management or computer-aided dispatch system based upon a decision from an incident commander. Once a device receives an incident termination beacon message, it may stop recording. The recorded data including the incident identifier in the metadata may then be transferred to a central legal evidence management system for integration, retention, and possible eventual use as legal evidence for the incident.

In this way, in one embodiment, all devices within an area where incident action is occurring automatically become part of the incident, and can add the video, audio, and metadata plus pre-event video, audio, and metadata they are capturing to the overall video, audio, and metadata integrated stream that has been captured for the incident. In some embodiments, no human intervention is required to manually turn on recording, retain pre-event data, or provide real-time situational awareness updates of location and status. Police officers and other first responders can focus on the immediate task at hand, which will increase officer safety, reduce deaths and injuries, reduce or avoid property damage, and reduce damage repair costs for first responder vehicles and equipment, while at the same time capturing indisputable video, audio, and metadata facts about the incident.

In an aspect, mobile and fixed location devices may be configured to receive, process, and re-broadcast incident beacon messages. The beacon message process may be sent in a variety of manners, such as through an asynchronous message, and may not require an active session or device registration to exist between two devices before the beacon message can be received and processed. In an embodiment, the beacon message can be, for example, a UDP or other type of message packet with an encrypted payload that does not require or expect an acknowledgement. Other devices in the system with software that can decode the message packet may take an action based upon receiving the beacon message. When a device is actively engaged an incident, the device may periodically transmits a beacon message with a variety of information, such as the unique incident identifier, current location, device identifier, identifier and location of the incident originating device, and other metadata to allow for incident triggering, data storage, and pre-event data retention. Devices that are not configured to recognize the beacon message may ignore and discard the incident beacon message. The actual beacon message payload is modest, and may fit within the capacity of a single beacon message data packet.

The video may be transmitted using wired or wireless communications for storage. For example, a video camera worn by an officer may wirelessly transmit its video, with the incident identifier and other metadata for an incident, to a vehicle router. The transmission may also provide a matching indication of the officer who recorded the video, which may be established using a Near Field Communications (NFC) chip associated with issued equipment, a manual login by a user, or other techniques. For example, an NFC chip may be mounted on a holster that is used to hold a video recording device, such as a smartphone, which includes an NFC reader. By inserting the phone into the holster, a match may be made between the NFC chip and the smartphone (with an NFC receiver reader) so that the identity of the police officer may be confirmed.

The vehicle router and storage unit may then wirelessly transmit the video to central storage or storage in a distributed network. These network communications may occur over local or wide area connections that are wired, wireless, or any combination of the two, and may use encryption for secure transmission. The video may be uploaded automatically when an incident concludes or after an officer comes off a shift and checks their equipment back in, and at other times. The video from a plurality of sources may be associated together in storage based on the incident identifier and, in some embodiments, additional identifying metadata such as the time, date, location, and information identifying an officer who captured the video.

While several examples of devices and situations that may result in an incident beacon message being generated have been described, it will be appreciated that many other situations will arise that may lead, either through manual intervention or automatic processes, to generating a beacon message. For example, a license plate recognition system may generate real-time alert messages when certain classes of a wanted vehicle license plate are recognized, which may then be used to initiate an incident trigger at the location where the license plate was recognized. In an aspect, an emergency alert notification can be initiated discreetly from officer key fob buttons, wireless messaging wristband buttons and accelerometer motions and gestures, or personal body camera, or cell phone touch screen, or hard buttons or gestures to initiate an incident beacon without alerting a suspect that an incident has been initiated. Other noises in addition to a gunshot that match characteristics, such as a noise of above a certain minimum decibel level and at a frequency range, may also automatically initiate an incident beacon.

Legal evidence including video, audio, and metadata could become logically associated with more than one incident at the same time. An example could be an officer has initiated a DUI stop, and his vehicle video cameras and microphones, plus the officer's personal body camera, and other nearby video, audio, and metadata capture devices are recording the facts of the DUI stop incident. At a point during the DUI stop, a suspect vehicle involved in a different incident that started across town could turn into a pursuit, and the suspect vehicle from the second incident could drive by the location of the first officer's DUI stop. In this example, video, audio, and metadata from the DUI stop for the period of time when the second incident suspect vehicle is approaching and then passes by the first officer's DUI stop location could also become part of the legal evidence for the second incident. So some portion of the video, audio, and metadata could be part of two or more incidents at the same time. The metadata for the integrated data stream may capture and store unique incident identifiers for all incident event segments relevant to each incident, so that the single instance of video, audio, and metadata becomes part of the body of legal evidence facts for more than one incident.

The association of a single set of video, audio, and metadata to more than one incident may occur using, for example, a combination of location and date/time. An association only by a date and timestamp may not be sufficient to independently positively confirm that the video, audio, and metadata should be associated with any given incident. Location is fundamental to the relevance of legal evidence. If location metadata is not provided independently by the device, a person claiming to have been involved in the incident will have to testify as to the location of the device when it captured the video and/or audio data. And human recollection is always subject to error and forgetfulness.

Accordingly, video, audio, and metadata that is recorded near to the location of an incident may be marked with an incident identifier, to make this video, audio, and metadata available on a real-time basis to officers, dispatchers, and supervisors to maximize officer safety, reduce citizen personal injury, minimize property damage, and capture and securely store indisputable video, audio, and metadata evidence of an incident from sources within relevant proximity to the event. These multiple video, audio, and metadata sources may be integrated into an overall integrated data stream for an incident, such as by using an association in a database using the incident identifier, along with, in some embodiments, the time, date, and location.

Video and/or audio location and time as part of legal evidence metadata may positively confirm relevance to an incident. Such evidence is sufficient to be used in a court of law, and is therefore appropriately maintained and corroborated to meet such elevated standards. Mobile devices that do not have location sensing capability can inherit location data from the vehicle with which they are associated. Most mobile devices now have their own location sensing capability and can independently report the time and location of where the mobile device's video, audio, and metadata was captured. Beaconing a unique incident identifier to other devices within proximity of the current location(s) of an incident can ensure that video, audio, and metadata capture is initiated if the new device is not already capturing data, and that pre-event data being temporarily buffered by the new device can also be captured and retained.

In some embodiments, all video, audio, and metadata legal evidence available at all locations where an incident occurs may be captured, and may include all buffered pre-event data that might otherwise be lost if there was no method and process for notifying all devices within proximity of the incident over the life of an incident. Capture of legal evidence data may be automatically triggered so that police officers and other persons do not have to be distracted by having to remember to turn on video, audio, and metadata capture devices while an incident is in progress. This may be accomplished through, for example, personal body camera and/or wireless wristband button press, gesture, spoken keyword recognition, gunshot recognition, officer safety device tampering, and detecting that a citizen vehicle is fleeing the location of the initial stop. Once an incident has been started, the method and system automatically beacons nearby vehicle, personal body cameras, and other devices to start recording if they are not recording, and to save buffered pre-event data and include it in the integrated video, audio, and metadata stream for the incident.

These capabilities may increase officer safety, the safety of citizens involved in a stop or other activity, and the safety of bystanders, while reducing property damage that otherwise might have been caused during an incident that escalates. Extensive video, audio, and metadata can be collected by many devices nearby the locations of an incident, which may deter a citizen considering whether to commit a crime or to escalate an incident. There may be more objective and unbiased video, audio, and metadata facts about the truth of what actually occurred during the course of an incident without depending on the imperfect recollection from a person.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

While this specification contains many specific implementation details, these should not be construed as limitations on the claims. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

It should be appreciated that the logical operations described herein with respect the various figures may be implemented (1) as a sequence of computer implemented acts or program modules (i.e., software) running on a computing device, (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The invention claimed is:

1. A recording system for an emergency response unit, including:
   a first recording device configured to record a first video segment with an incident identifier and transmit a message including the incident identifier; and
   a second recording device configured to receive the message and record a second video segment with the incident identifier, wherein
   the first video segment and the second video segment are associated using the incident identifier.

2. The recording system of claim 1, wherein:
   the first recording device is configured to begin recording upon detecting an incident and save a predetermined amount of video that was captured prior to detecting the incident; and
   the second recording device is configured to save a predetermined amount of video that was recorded prior to receiving the message.

3. The recording system of claim 1, wherein:
   a location of the first recording device and a location of the second recording device are determined using a global positioning system; and
   the second recording device records the second video segment when the second recording device is within a certain distance of the first recording device.

4. The recording system of claim 1, further including a central storage system, wherein:
   the message is transmitted wirelessly to a plurality of recording devices, each recording device recording a video segment including the incident identifier, and
   the video segments are transferred to the central storage system.

5. The recording system of claim 1, wherein the first recording device is configured to begin recording automatically in response to a predefined event.

6. The recording system of claim 5, wherein the predefined event includes detecting a sound.

7. The recording system of claim 5, wherein the predefined event includes detecting a gesture using an accelerometer.

8. The recording system of claim 1, wherein the first recording device is a camera worn by a police officer and the second recording device is a camera mounted on a police vehicle.

9. The recording system of claim 1, wherein the message further includes a location of the first recording device.

10. A non-transitory computer readable medium storing instructions which, when executed by one or more processors, perform a method including:
    recording at least a first video, audio or data information segment, with an incident identifier;
    transmitting a message including the incident identifier;
    receiving the message;
    recording at least a second video, audio or data information segment, with the incident identifier if the location is determined to be within said certain pre-determined distance; and
    associating the first segment and the second segment using the incident identifier.

11. The non-transitory computer readable medium of claim 10, wherein the method further includes:
    locating a first recording device that records the first segment using a global positioning system;
    locating a second recording device that records the second segment using the global positioning system; and
    recording the second segment when the second recording device determines that it is within said certain distance of first recording device.

12. The non-transitory computer readable medium of claim 10, wherein the method further includes:
    recording at least one of video, audio and data upon detecting an incident;
    saving, as part of the first segment, a predetermined amount of data that was captured prior to the incident; and
    saving, as part of the second segment, a predetermined amount of that was recorded prior to receiving the message.

13. The non-transitory computer readable medium of claim 12, wherein the method further includes:
    wirelessly transmitting the message to a plurality of recording devices that are active and able to determine whether they are located within a certain distance of a data collection device associated with said incident, each recording device within said certain distance recording a segment including the incident identifier, and
    transferring the segments to a central storage system.

14. The non-transitory computer readable medium of claim 10, further including recording automatically in response to a predefined event.

15. The non-transitory computer readable medium 10, wherein the message further includes a location of the first recording device that is actively engaged in an incident.

* * * * *